(12) United States Patent
Zirnhelt

(10) Patent No.: US 11,182,798 B2
(45) Date of Patent: Nov. 23, 2021

(54) SESSION SIGNATURES

(71) Applicant: ServiceNow, Inc., Santa Clara, CA (US)

(72) Inventor: Erich Zirnhelt, Williams Lake (CA)

(73) Assignee: ServiceNow, Inc., Santa Clara, CA (US)

(*) Notice: Subject to any disclaimer, the term of this patent is extended or adjusted under 35 U.S.C. 154(b) by 843 days.

(21) Appl. No.: 15/887,256

(22) Filed: Feb. 2, 2018

(65) Prior Publication Data

US 2019/0244212 A1 Aug. 8, 2019

(51) Int. Cl.
*G06Q 30/00* (2012.01)
*G06N 5/04* (2006.01)

(52) U.S. Cl.
CPC ........... *G06Q 30/016* (2013.01); *G06N 5/047* (2013.01)

(58) Field of Classification Search
CPC ......... G06Q 30/016; G06N 5/047; G06N 5/04
See application file for complete search history.

(56) References Cited

U.S. PATENT DOCUMENTS

| 7,020,706 | B2 | 3/2006 | Cates |
| 7,673,340 | B1* | 3/2010 | Cohen ................ G06F 11/3438 726/22 |
| 7,716,353 | B2 | 5/2010 | Golovinsky |
| 7,769,718 | B2 | 8/2010 | Murley |
| 7,925,981 | B2 | 4/2011 | Pourheidari |
| 8,402,127 | B2 | 3/2013 | Solin |
| 8,612,408 | B2 | 12/2013 | Trinon |
| 8,832,652 | B2 | 9/2014 | Mueller |
| 9,065,783 | B2 | 6/2015 | Ding |
| 9,098,322 | B2 | 8/2015 | Apte |
| 9,122,552 | B2 | 9/2015 | Whitney |
| 9,317,327 | B2 | 4/2016 | Apte |
| 9,363,252 | B2 | 6/2016 | Mueller |

(Continued)

OTHER PUBLICATIONS

De Young, Anton. "Ticket deflection: the currency of self-service" Zendesk, May 22, 2017, https://www.zendesk.com/blog/ticket-deflection-currency-self-service/ (retrieved from Internet Wayback Machine, dated Jun. 15, 2017) (Year: 2017).*

(Continued)

*Primary Examiner* — Gabrielle A McCormick
*Assistant Examiner* — Maame Ofori-Awuah
(74) *Attorney, Agent, or Firm* — Fletcher Yoder PC

(57) ABSTRACT

A plurality of session signatures and a plurality of inference flags are stored in association with each other, each session signature representing a combination of flag values, each flag value signifying a key event. A plurality of session events are logged, each session event issuing from one of the remote client devices and having a corresponding session ID and associated data. The session events are grouped by their corresponding session IDs to create a plurality of session records, each session record including flag values for a plurality of key events. A session signature is identified for each session record from the stored session signatures based on the key event flag values of the session record, and a value of an inference flag associated with the identified session signature is obtained from a storage device. A predetermined operation is performed based on the obtained value of the inference flag.

20 Claims, 9 Drawing Sheets

(56) References Cited

U.S. PATENT DOCUMENTS

| | | | |
|---|---|---|---|
| 9,535,737 B2 | 1/2017 | Joy | |
| 9,645,833 B2 | 5/2017 | Mueller | |
| 9,654,473 B2 | 5/2017 | Miller | |
| 9,766,935 B2 | 9/2017 | Kelkar | |
| 9,805,322 B2 | 10/2017 | Kelkar | |
| 2005/0038914 A1* | 2/2005 | Prendergast | G06Q 30/02 709/250 |
| 2008/0228504 A1* | 9/2008 | Nguyen | G06Q 30/02 705/1.1 |
| 2016/0142541 A1* | 5/2016 | Sharpe | H04M 3/5141 379/92.01 |
| 2016/0247165 A1* | 8/2016 | Ryabchun | G06Q 30/016 |
| 2016/0350763 A1* | 12/2016 | Avila | G06F 16/24578 |

OTHER PUBLICATIONS

"Deflecting and Resolving Incidents with Knowledge," Service Now, retrieved from the Internet: URL: http://wiki.servicenow.com/index.php?title=Deflecting_and_Resolving_Incidents_with_Knowledge#gsc.tab=0 [retrieved on Oct. 4, 2017].

* cited by examiner

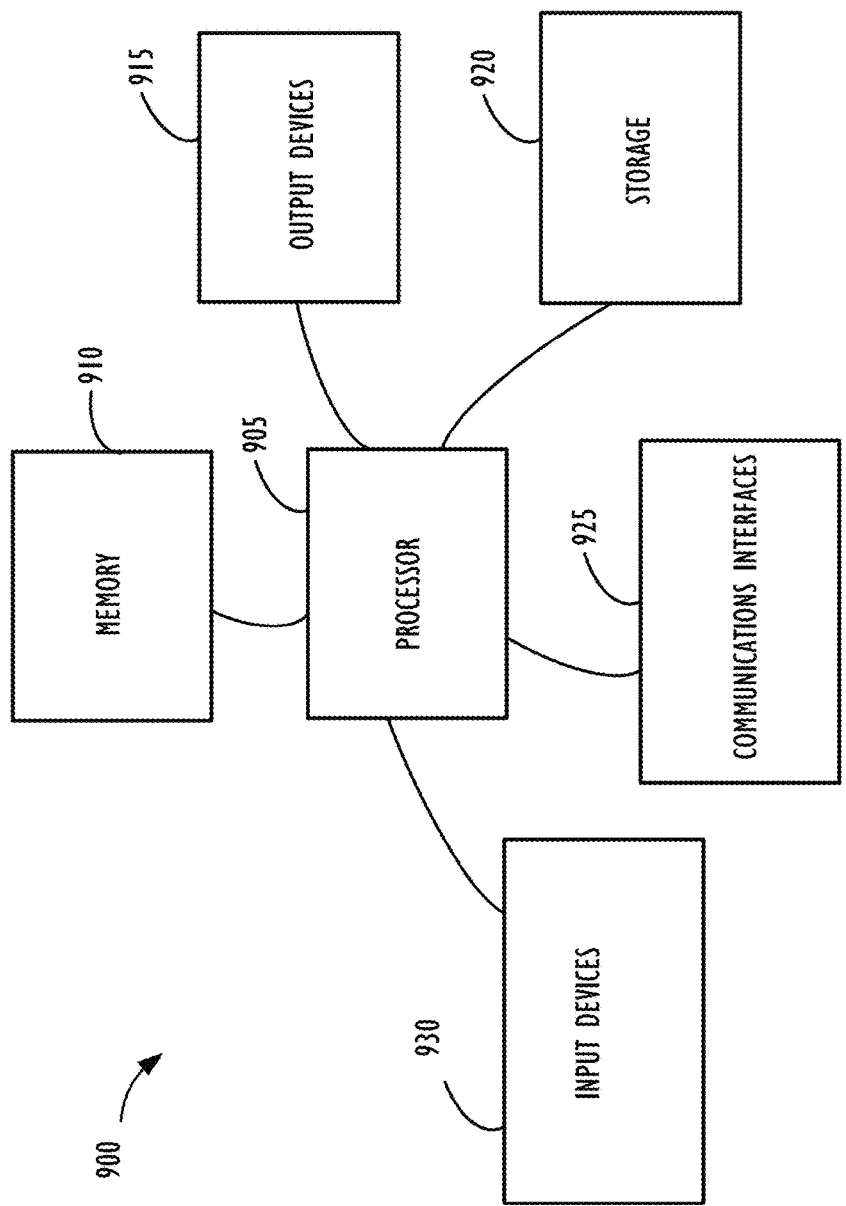

SESSION SIGNATURES

TECHNICAL FIELD

Embodiments described herein generally relate to customer/technical support (software, hardware, or cloud-based) and in particular to logging data of a user session and performing predetermined operations to infer patterns ("session signatures") of the user session.

BACKGROUND

Technical support may be provided to a user of an electronic device when such device fails to operate as desired. Technical support may include any activity performed for diagnosing or fixing a malfunctioning device. In an enterprise, technical support may be provided by a staff of technicians. For example, an enterprise having a relatively large number of computer users may employ a number of technicians particularly knowledgeable about the hardware and software systems used by the enterprise. Customer support may also be provided by the enterprise to help users efficiently use the hardware and software systems of the enterprise. The technical or customer support may be provided by the technicians or via a self-help portal where users may navigate to search for and view content to help the users find solutions to problems they are experiencing. The self-help portal may be implemented on a self-hosted system or a cloud computing based system of the enterprise.

Cloud computing relates to sharing of computing resources that are generally accessed via the Internet or other wide area network (WAN). In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

In the context of technical solutions, an enterprise having content to share may need to assess efficacy of the content being created and pushed to end users. That is, the enterprise may need to determine the value of the content being created and determine whether the content is achieving an intended goal (e.g., mitigating creation of new incident tickets by providing self-help or achieving shopping cart completions, online bookings, or form submissions). One approach to measure the value of content is to count a number of times the content has been viewed. However, it is difficult to determine whether a particular piece of content (content element) is achieving its intended goal based on the number of views because of the inherent uncertainty in determining whether viewing the particular piece of content directly caused the user to take a desired action (e.g., not create an incident ticket despite having an intent to do so, or perform a shopping cart completion, web booking or form submission).

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment a method includes storing a plurality of session signatures and a plurality of inference flags in association with the plurality of session signatures; providing a hosted client instance over a network interface for communicatively coupling with a remote client device, wherein each of the plurality of session signatures represents a different combination of respective flag values of a plurality of key events of a session with the hosted client instance of a user of the remote client device; logging a plurality of session events corresponding to a plurality of sessions of a plurality of users with the hosted client instance, each of the plurality of session events having a corresponding session ID and data associated with the session event; grouping the plurality of session events based on corresponding session IDs by creating a plurality of session records, wherein each of the plurality of session records includes, from among the logged plurality of session events, a first plurality of session events corresponding to a session of a user with the hosted client instance, and includes respective flag values of the plurality of key events of the session of the user; identifying, for each of the plurality of session records, a session signature from among the stored plurality of session signatures based on the respective flag values of the plurality of key events of the session record, and obtaining a value of at least one inference flag stored in the storage device in association with the identified session signature; and performing a predetermined operation based on the obtained values of the at least one inference flag.

In another embodiment, the method may be embodied in computer executable program code and stored in a non-transitory storage device. In yet another embodiment, the method may be implemented on a cloud-based computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 9 illustrates high-level block diagram 900 of a processing device (computing system) that may be used to implement one or more disclosed embodiments.

DESCRIPTION OF EMBODIMENTS

Figure 1:
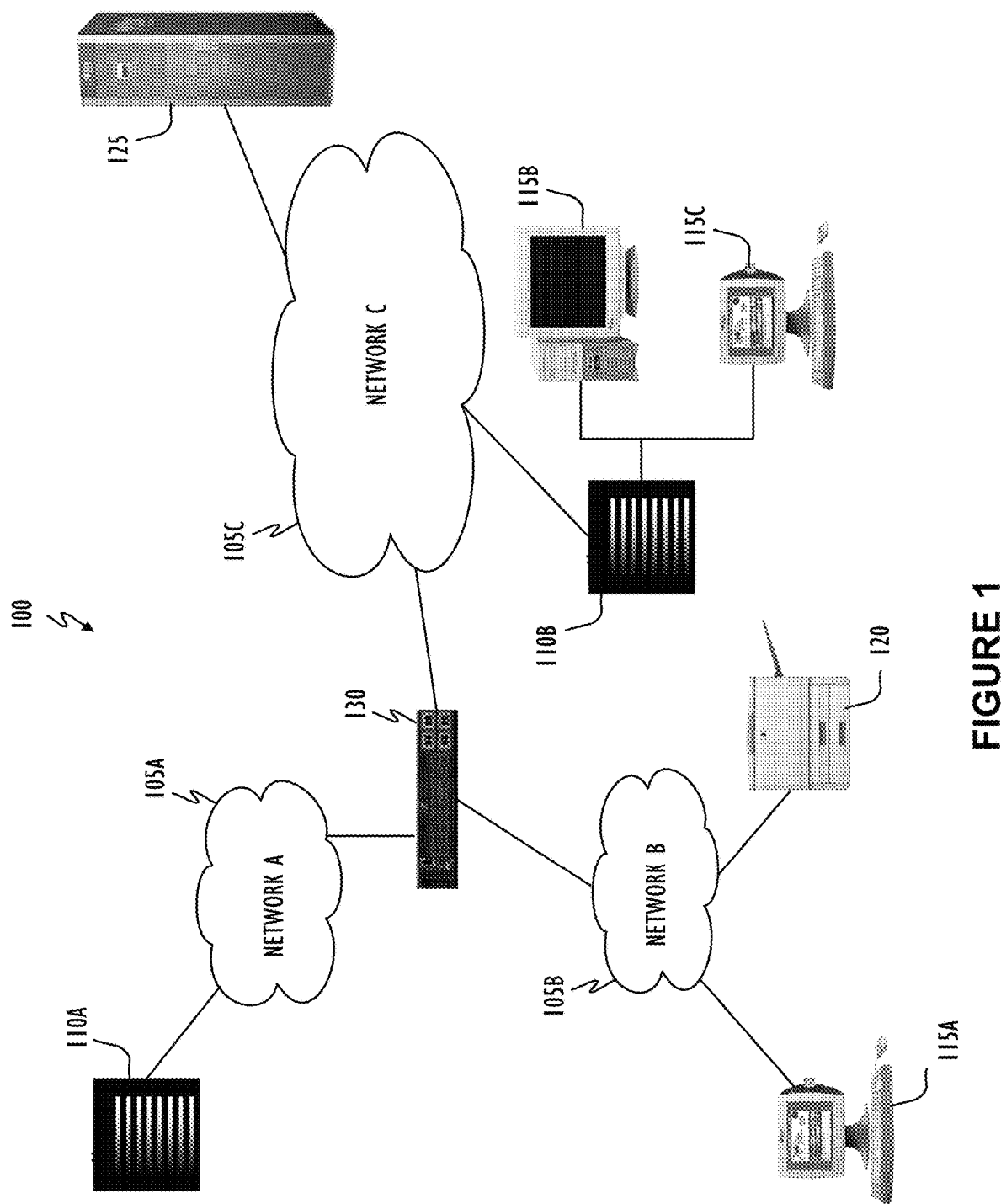
FIG. 1 illustrates a block diagram of self-hosted network system 100 where one or more embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

This disclosure pertains to storing session data in association with inference data, identifying a signature of a given session and performing predetermined operations based on the identification. The session signatures correspond to different combinations of flag values of predetermined key events associated with a session of a user with a hosted client instance. The key events may include a login event, a search event, a content view event, navigation to a get help page event, a community activity event, a create incident event, an add to shopping cart event, a checkout event, and the like. The flag value may indicate whether or not a corresponding event occurred or may indicate the number of times that event occurred within a predetermined period. Inference flags may be stored in association with the session signature and may indicate inferences that can be drawn from the session signature. The inference flags may include an intent flag, a deflection flag, a content presentment flag, a conversion flag, an acquisition flag, an engagement flag, and the like. The intent and deflection flags may represent whether or not a corresponding session signature indicates an intent to create an incident ticket or case and whether or not the incident ticket was actually created (i.e., whether the incident ticket was deflected), respectively. The content presentment flag may represent whether or not the corresponding signature indicates a certain type of content should be presented to a user. The content may be presented to the user based on identification of the problem the user is having and on session data associated with one or more events corresponding to a user's session with the hosted client instance. The conversion flag may represent whether or not the corresponding signature indicates the user performed a conversion (e.g., shopping cart completion, web booking or form submission) as a result of content presented to the user. In marketing technology, conversion refers to a situation when a user navigates to a portal with an intent to browse but then ends up performing a desired action (e.g., make a purchase or submit a form) As used herein, incident deflection refers to not creating an incident ticket after having an intent to do so.

More particularly, event data of a plurality of session events of a plurality of users of the hosted client instance may be logged and the event data may be grouped on a per-user-session basis and a session signature corresponding to each user session may be identified based on flag values of key events defining the signature for each user session. Inference flag values corresponding to the user session may be obtained based on the identified session signature and operations performed based on the inference flag values. For example, based on intent flag values and deflection flag values of each of a plurality of user sessions, a determination may be made for each session whether the user of that session intended to create an incident and whether the creation of the incident was deflected (because of content viewed by the user). Content attribution to credit the content with a deflection may be performed based on a determination regarding whether or not the incident ticket was created. One or more widgets may then be rendered on a remote client device to present a report on deflection measurement data showing a comparison over time between the number of user sessions in which the user indicated the intent to create the incident ticket and out of these user sessions, the number of user sessions in which the creation of the incident ticket was deflected. This report can then be presented to relevant stakeholders to drive decisions on content creation for an enterprise to provide self-help for various use cases with the goal of reducing the number of new incident tickets created while also determining the efficacy of the created self-help content. Additionally, based on the identified session signature of a particular session of the user, the associated content presentment flag value can be obtained for automatically determining the type of problem a user is having and the type of content to be presented to the user to solve the problem based on session data. For example, based on a session's signature and corresponding content presentment flag value, a chat bot virtual agent may automatically pop-up and recommend one or more pieces of content (content elements) or recommend search queries to the user based on session data of one or more logged events of the user's session.

FIG. 1 depicts an illustrative self-hosted network system 100 where one or more embodiments of the present disclosure may operate. This illustrative network system 100 may include a plurality of networks 105, (i.e., 105A, 105B, and 105C), each of which may take any form including, but not limited to, a local area network (LAN) or a WAN, such as the Internet. Further, networks 105 may use any desired technology (wired, wireless, or a combination thereof) and protocol (e.g., transmission control protocol, TCP). Coupled to networks 105 are data server computers 110 (i.e., 110A and 110B) that are capable of operating server applications such as databases and also capable of communicating over networks 105. One embodiment using server computers may involve the operation of one or more central systems to log user session data and identify session signatures of the user session.

Client computers 115 (i.e., 115A, 115B, and 115C), which may take the form of any smartphone, gaming system, tablet, computer, set top box, entertainment device/system, television, telephone, communications device, or intelligent machine, including embedded systems, may also be coupled to networks 105, and/or data server computers 110. In some embodiments, network system 100 may also include network printers such as printer 120 and storage systems such as 125, which may be used to store user session data or other data that are referenced herein. To facilitate communication between different network devices (e.g., data servers 110, end-user computers 115, network printer 120, and storage system 125), at least one gateway or router 130 may be optionally coupled there between. Furthermore, in order to facilitate such communication, each device employing the network may comprise a network adapter circuit and related software. For example, if an Ethernet network is desired for communication, each participating device must have an Ethernet adapter or embedded Ethernet capable ICs. Further, the devices may carry network adapters for any network in which they might participate (including, but not limited to, personal area networks (PANs), LANs, WANs, and cellular networks).

Figure 2:
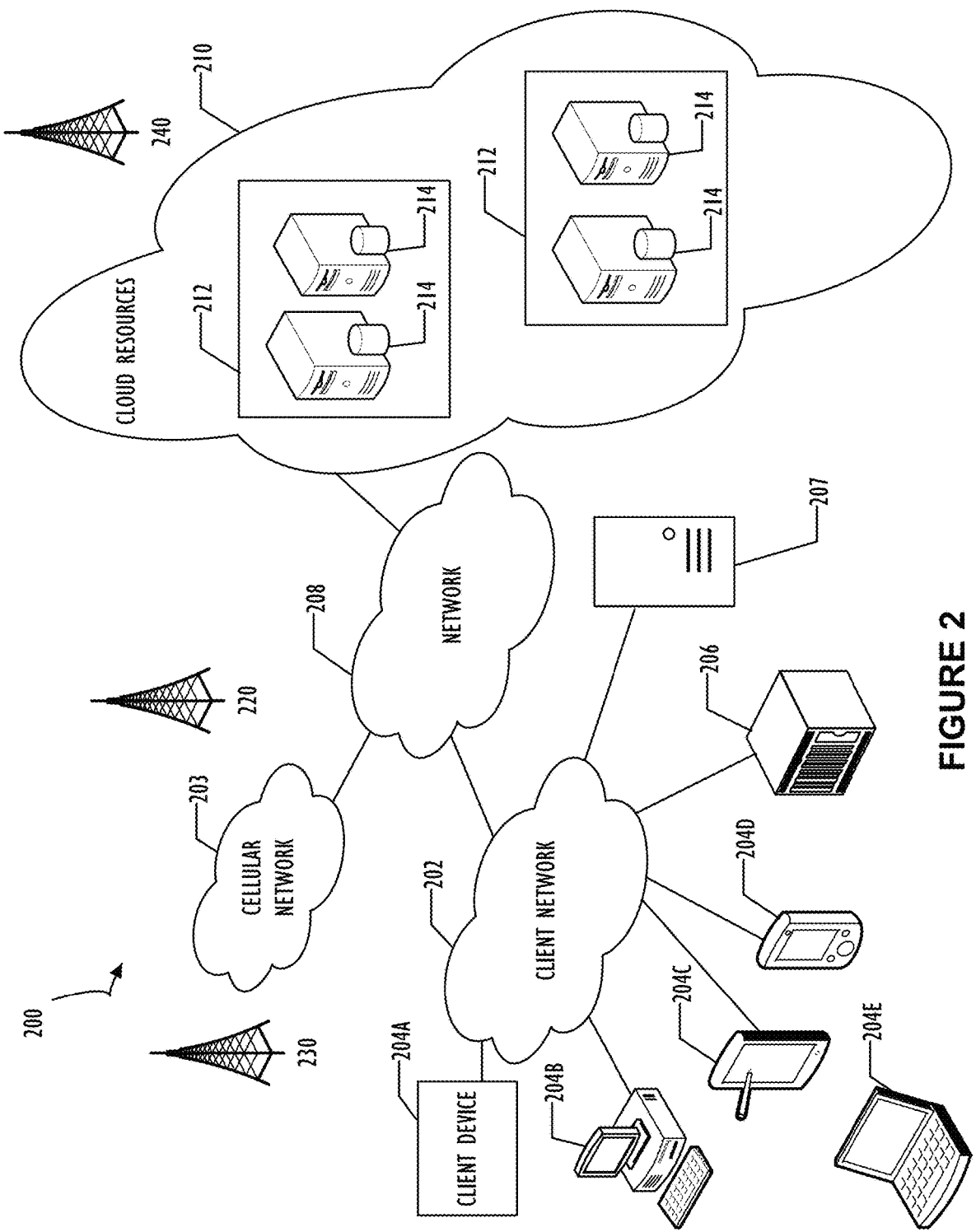
FIG. 2 illustrates a block diagram of cloud computing infrastructure 200 where one or more embodiments of the present disclosure may operate.

FIG. 2 illustrates a block diagram of an embodiment of a cloud computing infrastructure 200 where one or more embodiments of the present disclosure may operate. Cloud computing infrastructure 200 comprises a client network 202, network 208, and a cloud resources platform/network 210. In one embodiment, the client network 202 may be a local private network such as LAN that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 202 represents an enterprise network that could include or be communicatively coupled to one or more local area networks (LANs), virtual networks, data centers and/or other remote networks (e.g., 208, 210). As shown in FIG. 2, client network 202 may be connected to one or more client devices 204A-E and allow the client devices to communicate with each other and/or with cloud resources platform/network 210. Client devices 204A-E may be computing systems such as desktop computer 204B, tablet computer 204C, mobile phone 204D, laptop computer (shown as wireless) 204E, and/or other types of computing systems generically shown as client device 204A. Each of client devices 204A-E may be similar to any of client computers 115 of network system 100 shown in FIG. 1. FIG. 2 also illustrates that client network 202 may be connected to a local compute resource 206 that may include a server, access point, router, or other device configured to provide for local computational resources and/or to facilitate communication amongst networks and devices. For example, local compute resource 206 may be one or more physical local hardware devices configured to communicate with wireless network devices and/or facilitate communication of data between client network 202 and other networks such as network 208 and cloud resources platform/network 210. Local compute resource 206 may also facilitate communication between other external applications, data sources, and services, and client network 202. FIG. 2 also illustrates that client network 202 may be connected to a computer configured to execute a management, instrumentation, and discovery (MID) server 207. For example, MID server 207 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 207 may be configured to assist functions such as, but not necessarily limited to, discovery, orchestration, service mapping, service analytics, and event management. MID server 207 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 200 also includes cellular network 203 for use with mobile communication devices. Mobile cellular networks support mobile phones and many other types of mobile devices such as laptops etc. Mobile devices in cloud computing infrastructure 200 are illustrated as mobile phone 204D, laptop 204E, and tablet 204C. A mobile device such as mobile phone 204D may interact with one or more mobile provider networks as the mobile device moves, typically interacting with a plurality of mobile network towers 220, 230, and 240 for connecting to the cellular network 203. Although referred to as a cellular network in FIG. 2, a mobile device may interact with towers of more than one provider network, as well as with multiple non-cellular devices such as wireless access points and routers (e.g., local compute resource 206). In addition, the mobile devices may interact with other mobile devices or with non-mobile devices such as desktop computer 204B and various types of client device 204A for desired services. Although not specifically illustrated in FIG. 2, client network 202 may also include a dedicated network device (e.g., gateway or router) or a combination of network devices that implement a customer firewall or intrusion protection system.

FIG. 2 illustrates that client network 202 is coupled to a network 208. Network 208 may include one or more computing networks, such as other LANs, wide area networks (WANs), the Internet, and/or other remote networks, in order to transfer data between client devices 204A-E and cloud resources platform/network 210. Each of the computing networks within network 208 may contain wired and/or wireless programmable devices that operate in the electrical and/or optical domain. For example, network 208 may include wireless networks, such as cellular networks in addition to cellular network 203. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 208 may also employ any number of network communication protocols, such as Transmission Control Protocol (TCP) and Internet Protocol (IP). Although not explicitly shown in FIG. 2, network 208 may include a variety of network devices, such as servers, routers, network switches, and/or other network hardware devices configured to transport data over networks.

In FIG. 2, cloud resources platform/network 210 is illustrated as a remote network (e.g., a cloud network) that is able to communicate with client devices 204A-E via client network 202 and network 208. The cloud resources platform/network 210 acts as a platform that provides additional computing resources to the client devices 204A-E and/or client network 202. For example, by utilizing the cloud resources platform/network 210, users of client devices 204A-E may be able to build and execute applications, such as automated processes for various enterprise, IT, field service and/or other organization-related functions. In one embodiment, the cloud resources platform/network 210 includes one or more data centers 212, where each data center 212 could correspond to a different geographic location. Within a particular data center 212 a cloud service provider may include a plurality of server instances 214. Each server instance 214 may be implemented on a physical computing system, such as a single electronic computing device (e.g., a single physical hardware server) or could be in the form of a multi-computing device (e.g., multiple physical hardware servers). Examples of server instances 214 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of MySQL AB.

To utilize computing resources within cloud resources platform/network 210, network operators may choose to configure data centers 212 using a variety of computing infrastructures. In one embodiment, one or more of data centers 212 are configured using a multi-tenant cloud architecture such that a single server instance 214, which can also be referred to as an application instance, handles requests and serves more than one customer. In some cases, data centers with multi-tenant cloud architecture commingle and store data from multiple customers, where multiple client instances are assigned to a single server instance 214. In a multi-tenant cloud architecture, the single server instance 214 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 214 causing outages for all customers allocated to the single server instance 214.

In another embodiment, one or more of the data centers 212 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 214 and/or other combinations of server instances 214, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 210, and customer-driven upgrade schedules. An example of implementing a client instance within a multi-instance cloud architecture will be discussed in more detail below when describing FIG. 3.

Figure 3:
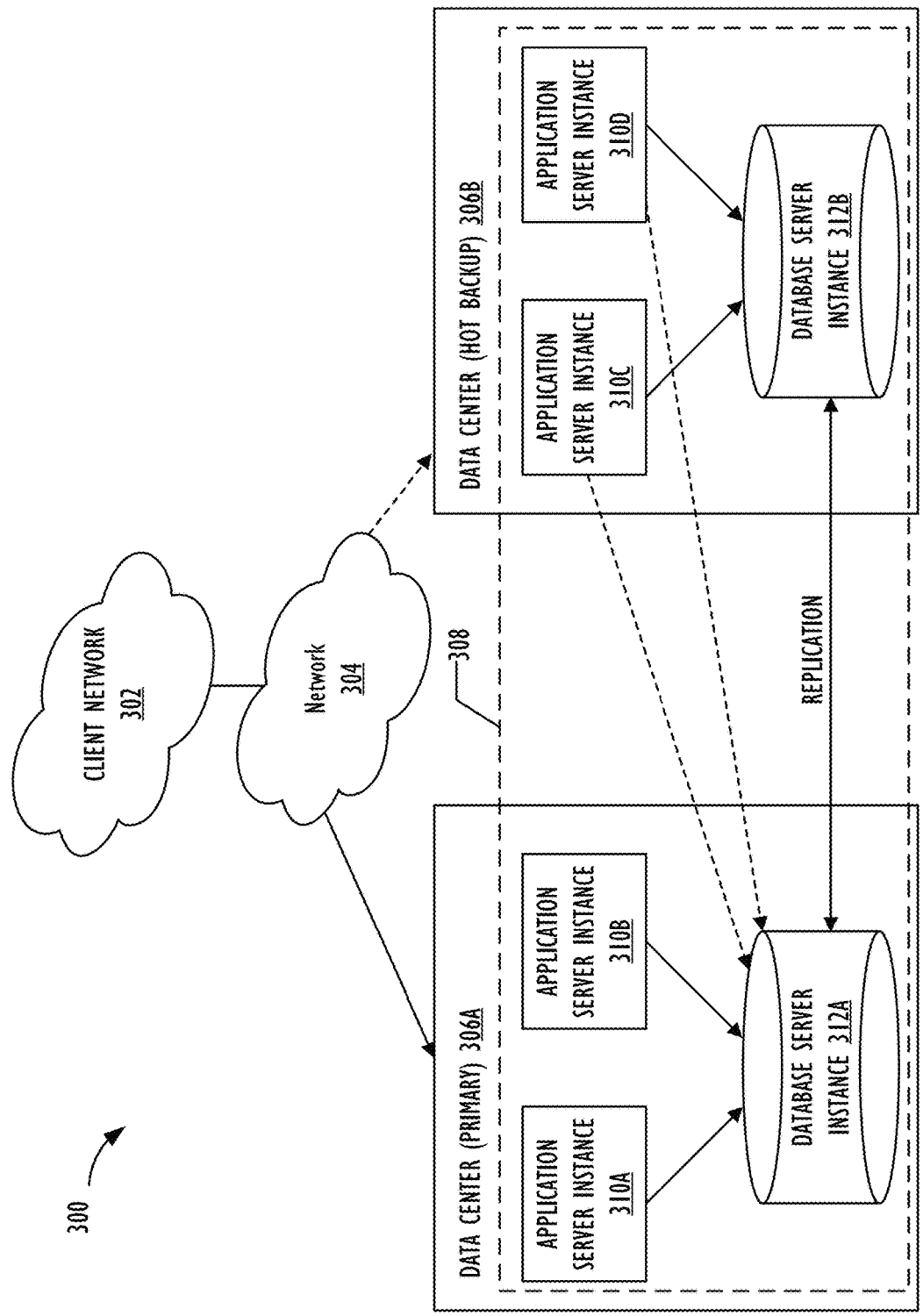
FIG. 3 illustrates a block diagram of multi-instance cloud architecture 300 where one or more embodiments of the present disclosure may operate.

In one embodiment, utilizing a multi-instance cloud architecture, a first client instance may be configured with a client side application interface such as, for example, a web browser executing on a client device (e.g., one of client devices 204A-E of FIG. 2). FIG. 3 illustrates a block diagram of an embodiment of a multi-instance cloud architecture 300 where embodiments of the present disclosure may operate. FIG. 3 illustrates that the multi-instance cloud architecture 300 includes a client network 302 that connects to two data centers 306A and 306B via network 304. Client network 302 and network 304 may be substantially similar to client network 302 and network 208 as described in FIG. 2, respectively. Data centers 306A and 306B can correspond to FIG. 2's data centers 212 located within cloud resources platform/network 210. Using FIG. 3 as an example, a client instance 308 is composed of four dedicated application server instances 310A-310D and two dedicated database server instances 312A and 312B. Stated another way, the application server instances 310A-310D and database server instances 312A and 312B are not shared with other client instances 308. Other embodiments of multi-instance cloud architecture 300 could include other types of dedicated server instances, such as a web server instance. For example, client instance 308 could include the four dedicated application server instances 310A-310D, two dedicated database server instances 312A and 312B, and four dedicated web server instances (not shown in FIG. 3).

To facilitate higher availability of client instance 308, application server instances 310A-310D and database server instances 312A and 312B are shown to be allocated to two different data centers 306A and 306B, where one of data centers 306 may act as a backup data center. In reference to FIG. 3, data center 306A acts as a primary data center that includes a primary pair of application server instances 310A and 310B and primary database server instance 312A for client instance 308, and data center 306B acts as a secondary data center to back up primary data center 306A for client instance 308. To back up primary data center 306A for client instance 308, secondary data center 306B includes a secondary pair of application server instances 310C and 310D and a secondary database server instance 312B. Primary database server instance 312A is able to replicate data to secondary database server instance 312B. As shown in FIG. 3, primary database server instance 312A replicates data to secondary database server instance 312B using a replication operation such as, for example, a Master-Master MySQL Binlog replication operation. The replication of data between data centers could be implemented in real time or by implementing full backup weekly and daily incremental backups in both data centers 306A and 306B. Having both a primary data center 306A and secondary data center 306B allows data traffic that typically travels to the primary data center 306A for client instance 308 to be diverted to secondary data center 306B during a failure and/or maintenance scenario. Using FIG. 3 as an example, if application server instances 310A and 310B and/or primary data server instance 312A fail and/or are under maintenance, data traffic for client instance 308 can be diverted to secondary application server instances 310C and 310D and secondary database server instance 312B for processing.

Although FIGS. 2 and 3 illustrate specific embodiments of cloud computing system 200 and multi-instance cloud architecture 300, respectively, the disclosure is not limited to the specific embodiments illustrated in FIGS. 2 and 3. For instance, although FIG. 2 illustrates that cloud resources platform/network 210 is implemented using data centers, other embodiments of the cloud resources platform/network 210 are not limited to data centers and can utilize other types of remote network infrastructures. Moreover, other embodiments of the present disclosure may combine one or more different server instances into a single server instance. Using FIG. 3 as an example, application server instances 310 and database server instances 312 can be combined into a single server instance. The use and discussion of FIGS. 2 and 3 are only exemplary to facilitate ease of description and explanation.

Figure 4:
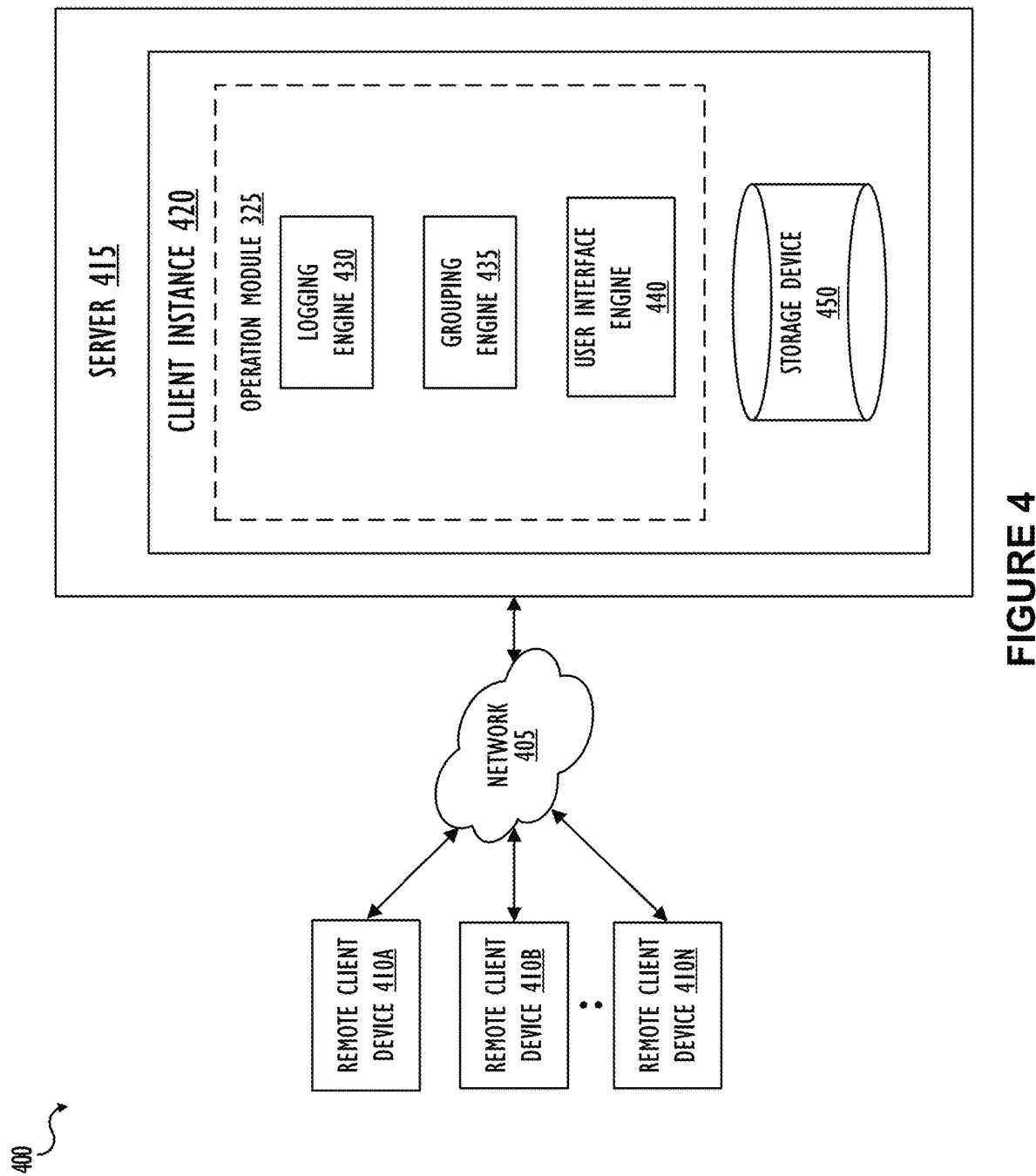
FIG. 4 illustrates a block diagram of cloud-based system 400 where one or more embodiments of the present disclosure may operate.

FIG. 4 illustrates a block diagram of system 400 where one or more embodiments of the present disclosure may operate. System 400 includes remote client devices 410A-N that are communicatively coupled with server 415 over network 405. Network 405 may include one or more computing networks, such as LANs, WANs, the Internet, and/or other remote networks, in order to transfer data between server 415 and client devices 410A-N. Server 415 may be similar to cloud resources platform/network 210 of cloud computing system 200 shown in FIG. 2 or to data server computers 110 of network system 100 of FIG. 1. Client instance 420 may be hosted on the server 415, and client instance 420 may be similar to client instance 308 of multi-instance cloud architecture 300 shown in FIG. 3. Alternately, client instance 420 may be hosted on data server computers 110 of network system 100 of FIG. 1. For ease of description, only relevant portions of client instance 420 are shown in FIG. 4 and described in detail. Client instance 420 may include operation module 425 that interacts with storage device 450 at a backend. Operation module 425 may include logging engine 430, grouping engine 435, and user interface (UI) engine 440. Client devices 410A-N may be communicatively coupled to client instance 420 to access data and enterprise-level software applications on client instance 420. Each of client devices 410A-N may be similar to any of client devices 204A-E of cloud computing system 200 shown in FIG. 2 or to client computers 115 of system 100 of FIG. 1. Each client device 410A-N may correspond to a particular user to securely access data and applications on client instance 420 via a web browser following user authentication. Multiple users using client devices 410A-N may simultaneously interact with client instance 420 to have multiple simultaneous authenticated sessions with client instance 420.

Logging engine 430 may be a weblog for tracking web traffic on client instance 420 associated with the multiple simultaneous sessions of multiple users accessing client instance 420 via respective remote client devices 410A-N. For example, logging engine 430 may create a log file having a log file entry (row) for each event performed by each user of each session with client instance 420. An event may correspond to any interaction between client instance 420 and a user of an authenticated session with client instance 420. For example, the event may be a login event of a user logging on by securely authenticating to client instance 420; a search event of the user searching for content on client instance 420 or on a network external to client instance 420 or on the Internet; a view event of the user viewing a particular page; a create incident event of the user creating an incident ticket or case on client instance 420 and the like. Each entity in the log file may include fields for storing information related to the event and may include a date and time field indicating the event's date and time; a log file identification number field indicating a unique identification number for each log file entry (i.e., each event); a session ID field indicating a unique identification number for each session of a user on client instance 420 (a session can have multiple events associated with the same user); a user name field indicating a name of the user associated with the log file entry; current and previous page view fields indicating current and previous pages visited by the user; event field indicating a type of event (e.g., page view, page load, incident creation, and the like); keyword field; record count field; task field and the like.

Grouping engine 435 groups a plurality of log file entries (i.e., session events) based on user session IDs to create a plurality of session records. More particularly, grouping engine 435 groups multiple events logged by logging engine 430 for each user session based on the unique session ID of each user session. Each session record thus created by grouping engine 435 may include fields for storing information related to the session record including a date and time field indicating a date and time the session record was created; a user name field indicating a name of the user associated with the session record; a session ID field indicating the unique session ID of the user session record; technology of the client, such as browser and operating system. Grouping engine 435 may further identify log file entries from the log file that correspond to certain key events associated with each session record and store flag values associated with the key events in the session record. The key events may include a login event of the user logging on to client instance 420, a search event of the user searching for content on client instance 420 (see FIG. 5); a get help event of the user navigating to a Get Help page of client instance 420 (see FIG. 6); a view event of the user viewing content; and an incident creation event of the user creating an incident ticket or case. Key events are not limited to the above and additional/alternate key events may be defined. Further, values associated with the key events may be flag values (true or false) indicating whether or not the event occurred or may be values indicating whether or not the event occurred and further indicating the number of times that event occurred.

Figure 5:
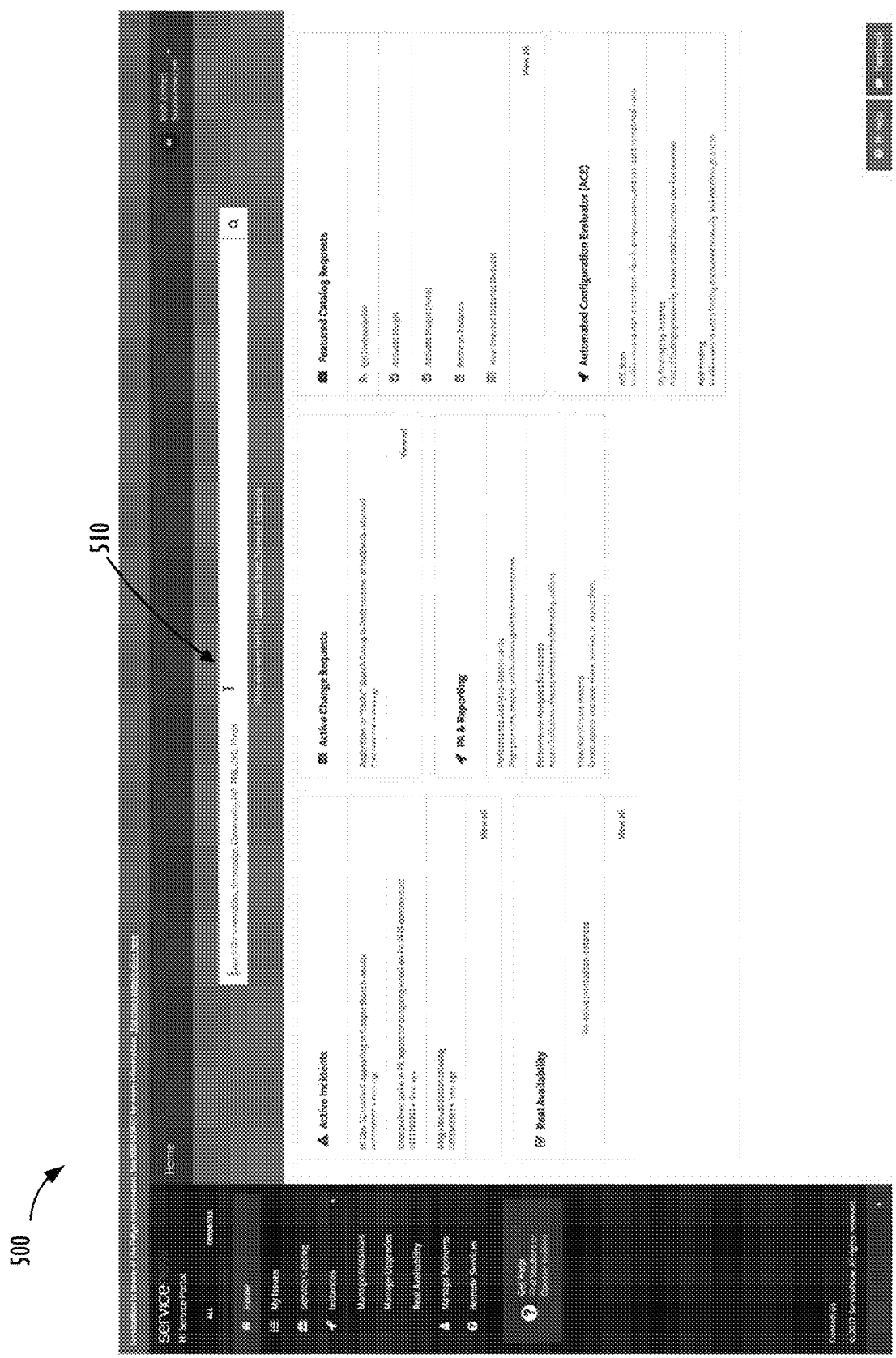
FIG. 5 shows a screen shot of graphical user interface (GUI) 500 in accordance with one or more embodiments.
Figure 6:
FIG. 6 shows a screen shot of GUI 600 in accordance with one or more embodiments.

FIGS. 5 and 6 show screen shots of GUIs 500 and 600 in accordance with one or more embodiments. GUI 500 of FIG. 5 illustrates a search home screen of client instance 420 where a user can enter a search query in field 510 to find content to help resolve an issue the user is having. Entering a search query in field 510 and running the search causes logging engine 430 to create a new log entry in the log file to log the search event in association with information regarding the session of the user performing the search. This results in search event flag value for the corresponding user session to be set to true (because the user of that session performed a search). GUI 600 of FIG. 6 illustrates a Get Help landing page of client instance 420 where a user may navigate to get help with resolving an issue the user is having. From the landing page shown in FIG. 6, the user may navigate to various pages to ask a question 610 to an expert, open a new incident ticket 620, view previously asked questions and answers on a community forum 630, and access other self-service support resources 640. The user navigating to the landing page illustrated in FIG. 6 causes logging engine 430 to create a new log entry in the log file to log a Get Help event in association with information regarding the session of the user. Grouping engine 435 then sets to true the Get Help key event flag value for this user session (session ID).

Thus, grouping engine 435 stores flag values associated with each key event of each session record based on whether or not the key event was identified in a log file entry of the log file (i.e., the event occurred). In one embodiment, grouping engine 435 may store a Boolean value (true or false) associated with each key event in the session record. In another embodiment, grouping engine 435 may store, for each key event, a value indicating whether or not the key event occurred, and further store a value indicating the number of times the key event occurred and store additional information related to the key event like the search query or address of page visited. Further, grouping engine 435 may include logic to group a plurality of events logged by logging engine 430 and having the same session ID based on the date and time when each of the plurality of events was created. Thus, for example, grouping engine 435 may consider the plurality of events to correspond to the same session record only if the date and time of creation of each of the events is within a predetermined period of time (e.g., 24 hours).

Storage device 450 may be provided on client instance 420 of server 415 and coupled with operation module 425. Storage device 450 may be a relational database including a table for storing log file data generated by logging engine 430 and a table for storing session record data generated by grouping engine 435. Storage device 450 may further store predetermined session signature data and inference data in association with each other. The session signature data may include multiple predefined session signatures defining different use cases based on different combinations of flag values of key events of a session of a user with client instance 420. For example, the signatures may be predefined based on predetermined key events defining user behavior in a user session with client instance 420 and predetermined inferences may be derived for each session signature. Key events may include a login event; a Get Help event; a search event; a view content event; an incident creation event; a conversion event and the like. Based on user behavior for each of the above exemplary key events for a given user session, inferences may be derived indicating a user's intention as gleaned from the session signature. Inference flag values based on the derived inferences may be stored in association with the session signature. In one embodiment, the inference flag values associated with session signatures may be stored in advance in association with the respective session signatures in storage device 450. In another embodiment, the inference flag values for each session signature may be settable and updatable by a user of client instance 420 having predetermined privileges and stored in storage device 450 for use by operation module 425 during operation. The inference values may be flag values (true or false) indicating whether or not the corresponding inference is set to true or may be a value representing a type of problem indicated by the corresponding session signature.

The session signatures may be used in a variety of contexts. In one embodiment, the session signatures may be used for determining the value of content by measuring deflection and attributing deflection to particular pieces of content (particular content element). In another embodiment, the session signatures may be used for recognizing a problem a user is having and automatically presenting content to the user based on past user session data. In yet another embodiment, the session signatures may correspond to determining value of content by measuring user conversion in an online shopping, web booking or form submission context and attributing conversions to particular pieces of content. Above embodiments are exemplary and other embodiments are possible. Session signatures can be made of any key behavior. For example, session signatures can be made for human resource document tracking for compliance, touchpoints for trigger events in customer service management, knowledge management, IT service management, service portals, and performance analytics. Exemplary session signature data that may be used for determining content value by measuring deflection and attributing deflection to particular pieces of content is illustrated in Table 1 below. In Table 1, a session signature consists of 5 key event flag values (Login; Get Help; Search; View; Create Incident). Inference flag values (for Intent to create an incident, and whether creation of the incident was explicitly deflected or possibly deflected) derived from the session signature are stored in association with the session signature in storage device 450. Since the "Login" key event in Table 1 is always true, there are 16 possible session signatures for different combinations of the remaining 4 key events. Table 1 further explains the use case of user behavior corresponding to each session signature.

TABLE 1

| Session | Signature | Intent | Explicitly Deflected | Possibly Deflected | Use Case |
| --- | --- | --- | --- | --- | --- |
| A | 11111 | 1 | 0 | 0 | Create incident after researching |

TABLE 1-continued

| Session | Signature | Intent | Explicitly Deflected | Possibly Deflected | Use Case |
|---|---|---|---|---|---|
| B | 11110 | 1 | 1 | 0 | Deflected by search/view content |
| C | 11100 | 1 | 0 | 1 | Exit after search/snippet view |
| D | 11011 | 1 | 0 | 0 | Viewed then created incident |
| E | 11010 | 1 | 1 | 0 | Deflected by top article or alert |
| F | 11001 | 1 | 0 | 0 | Straight to create incident |
| G | 11000 | 0 | 0 | 0 | No intent to create incident |
| H | 11101 | 1 | 0 | 0 | Failed get help search |
| I | 10111 | 1 | 0 | 0 | Home search/view but create incident |
| J | 10110 | 1 | 1 | 0 | Deflected by home search result/view |
| K | 10100 | 0 | 0 | 0 | No intent/home search and exit |
| L | 10011 | 1 | 0 | 0 | Directly view content/create incident |
| M | 10010 | 0 | 0 | 0 | No intent/passer-by view of content |
| N | 10001 | 1 | 0 | 0 | Directly create incident |
| O | 10000 | 0 | 0 | 0 | No intent |
| P | 10101 | 1 | 0 | 0 | Failed home search |

In Table 1, Session A is a user session in which a user logged in, clicked on a Get Help page (FIG. 6), searched for content (FIG. 5), viewed content, and created an incident. Since the user created an incident, the user clearly had an intent to create the incident (Intent=1) and there was no incident deflection (Explicitly/Possibly Deflected=0). Further, Session B is a user session in which the user logged in, clicked on the Get Help page, searched for content, viewed content, and did not create an incident. From this user behavior, intent to create an incident can be derived (Intent=1). Further, the user possibly found content (by clicking on Get Help page, searching, and viewing content) that helped the user solve the issue the user was trying to solve. Therefore, the creation of the incident was deflected (Explicitly Deflected=1). Session C is a user session in which the user logged in, clicked on the Get Help page, and searched for content, but did not view content or create an incident. From this user behavior, intent to create an incident can be derived (Intent=1). Further, since the user did not explicitly view any content, there is no explicit deflection (Explicitly Deflected=0). However, the user may have viewed content shown in a snippet format on a search results page in response to the search query, and the user may have resolved the issue the user was having by viewing the snippet of the search result, thereby possibly deflecting the creation of an incident (Possibly Deflected=1). Use cases for Sessions D-P may be similarly understood in viewing Table 1 above.

Similar session signatures may be defined for additional use cases of user behavior and additional/alternate key events having associated inference data may be defined. Further, instead of having Boolean flag values for each key event, a session signature may correspond to values uniquely specifying whether or not a given key event occurred and a number of times that event occurred. Associated inference values (flag values or other types of values) may be stored for such session signatures to, for example, determine the problem a user is having and content that may be presented to a user to assist that user in solving the problem. For example, a use case of a failed attempt to login by a user after trying to login multiple times may be determined to correspond to a session signature that may define inferences (e.g., a content presentment flag) based on which corrective action is performed to automatically present appropriate content to the user. For example, a chat bot virtual agent may automatically recommend content on resetting password to the user based on the session signature or suggest a search query to the user. Client instance 420 may rely on session data logged by logging engine 430 and associated with the user session to determine what content to present to the user. Content attribution values stored in storage device 350 in association with pieces of content and indicating the value of the piece of content may be relied upon in determining whether or not to present a particular piece of content to the user based on the corresponding session signature and content presentment flag value.

Returning to FIG. 4, after grouping events from log file entries based on session IDs, grouping engine 435 may identify the key events from among the grouped events and store respective flag values of the key events in association with the session record ID. Grouping engine 435 may then map the respective flag values of the key events of the session record to a session signature stored in storage device 450 and obtain corresponding inference data. For example, in Table 1 above, intent and deflection flag values may be obtained corresponding to the identified session signature and the inference values may be stored in association with the session record in storage device 450. Mapping respective flag values of key events of session records to session signatures allows pooling user behavior in neat buckets that distill user behavior into a handful of key findings. The key findings may then be used to drive content creation and determining the effect of content creation on target metrics like deflection, conversion, acquisition, engagement, and the like. In one embodiment, the sequence in which the various key events of the session record occur may be ignored, as long as the key events all occurred within a predetermined period of time. By ignoring the sequence in which the key event activities occurred and instead focusing on the mix of behavior to identify a handful of key findings, deflection (or other behavior) can be trended mostly accurately within an acceptable margin of error while simplifying logic and eliminating the countless permutations of different sequences of the same key events when deriving inferences from user behavior. This may be particularly true when a session ID represents a large number of key events.

When the session record signature indicates a successful deflection, grouping engine 435 may further identify content viewed by the user of the session record to which the deflection can be attributed. Thus, for example, a page last visited by the user before the end of the user's session (i.e., last page view event for the session ID in the log file) may be identified as a piece of content that solved the problem the user was having (i.e., the piece of content achieved its intended goal), and deflection in the session record may be attributed to this piece of content by grouping engine 435 saving information regarding the piece of content in association with the session record ID. Conversely, if the session signature of the session record indicates that an incident was created, non-deflection may be attributed to the last piece of content viewed by the user, thereby indicating that the piece of content is not achieving its intended goal. The piece of content (content element) may be any type of information such as a knowledge base article, community forum post, service catalog, documentation, blog post, wiki, video, and the like.

Figure 8:
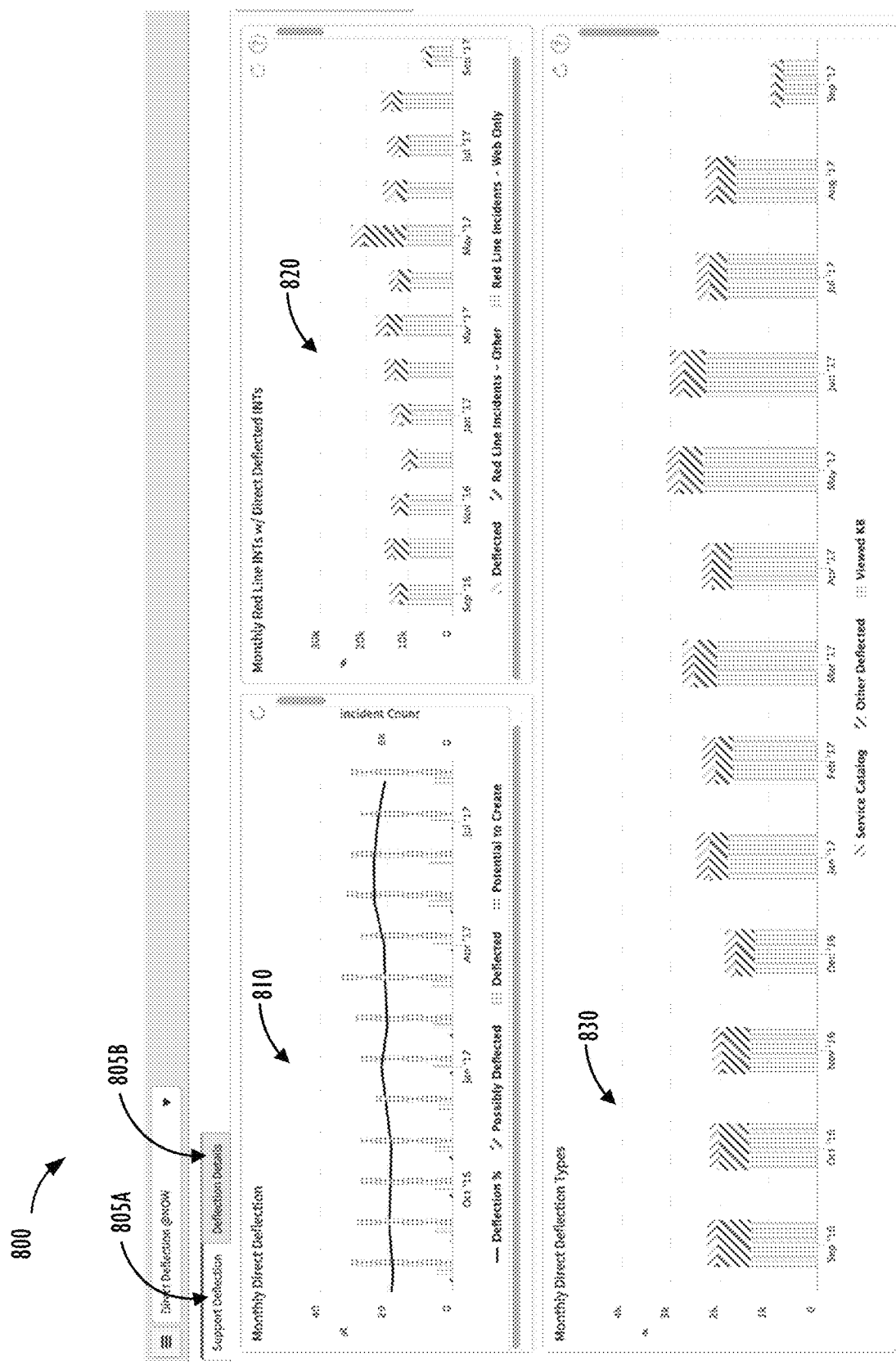
FIG. 8 shows a screen shot of GUI 800 for rendering widgets on a deflection dashboard to visualize data associated with intent to create an incident and deflected incidents in accordance with one or more embodiments.

Operation module 425 further includes user interface engine 440 to cause data to be presented on any of remote client devices 410A-N. Data may include a piece of content or one or more widgets to present, for example, deflection measurement data of client instance 420 associated with multiple sessions of multiple users over a predetermined period of time. In particular, UI engine 440 on client instance 420 may include logic to cause remote client devices 410A-N to render dashboards, scorecards, widgets and other visualizations using data logged by logging engine 430 and grouped by grouping engine 435 and corresponding session signature data and inference data obtained from storage device 450. Scorecards refer to a graphical visualization of the scores of an indicator. In a scorecard, the scores of an indicator may be analyzed further by viewing the scores by breakdowns (scores per group), aggregates (counts, sums, and maximums), time series (totals and averages applied to different time periods) and (if available) drilling down to the records on which the scores are based. Dashboards may refer to a visualization presented to a user of client instance 420 (See FIG. 8 illustrating a deflection dashboard. FIG. 8 is explained in detail later). A dashboard may have multiple tabs to analyze and interact with visualizations of indicator scores, called widgets. Each tab of the dashboard may hold one or more widgets. A user may have one or more dashboards assigned for viewing. Widgets determine how data is presented on dashboards and are visible only when added to a dashboard. Widgets allow visualizations of multiple indicators on a single dashboard in order to visualize multiple score sources. A widget can be configured to have different visualization types to display data as a time series, score, list, or breakdown. For example, a widget can be configured as a chart, latest score, speedometer, dial, scorecard, or column.

Figure 7:
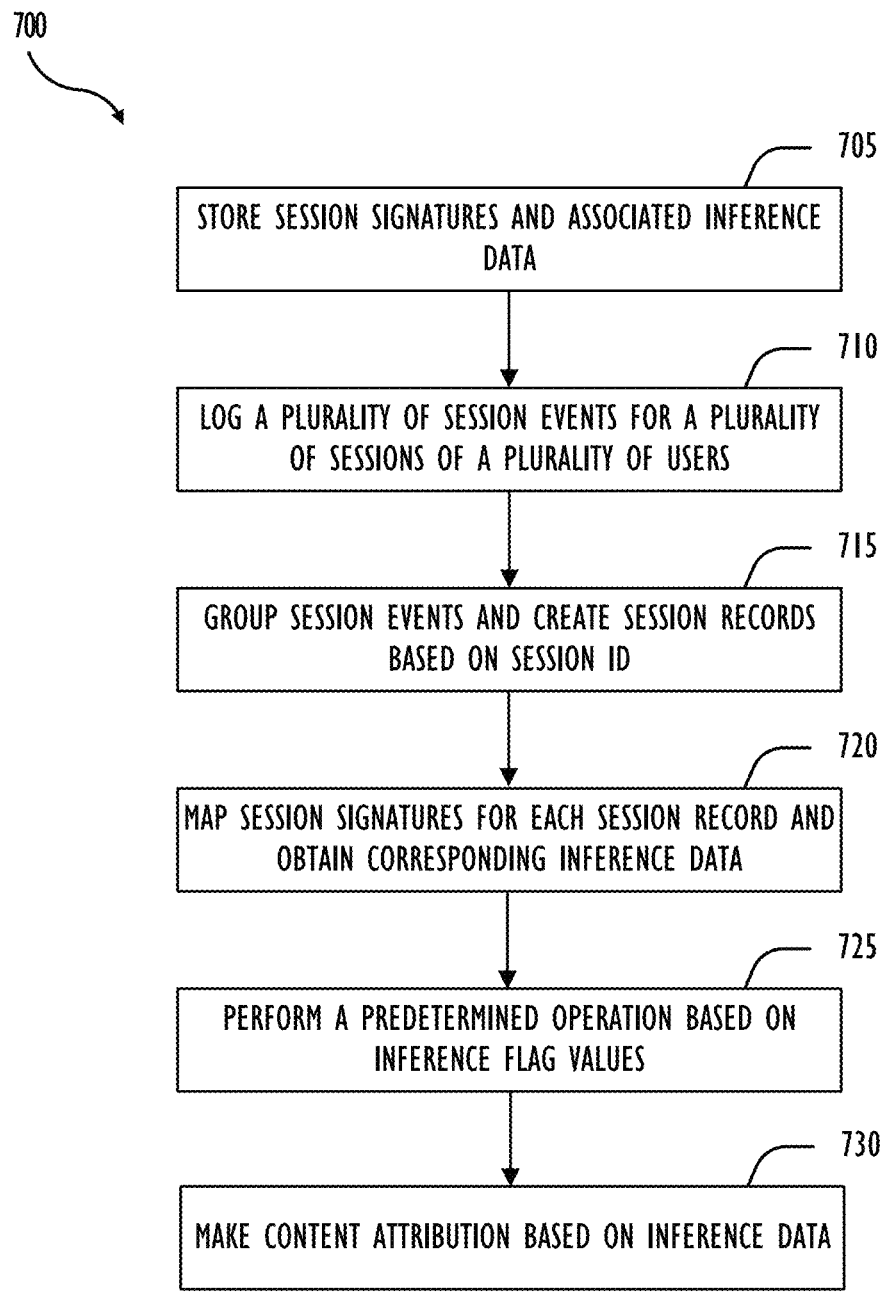
FIG. 7 shows flowchart 700 illustrating operation of cloud-based system 400 of FIG. 4 in accordance with one or more disclosed embodiments.

FIG. 7 shows flowchart 700 illustrating operation of cloud-based system 400 of FIG. 4 in accordance with one or more disclosed embodiments. Flowchart 700 begins at block 705 with client instance 420 storing the session signatures and associated inference data in storage device 450. The session signatures and associated inference data may be configurable by a user. At block 710, logging engine 430 logs multiple session events for multiple sessions on remote client devices 410A-N by respective users with client instance 420. At block 715, grouping engine 435 groups the session events logged at block 710 based on session IDs of multiple sessions of the multiple users to create the plurality of session records corresponding to the session IDs. For each session record, grouping engine 435 identifies key events from the grouped plurality of session events and stores flag values of the key events in association with the session record. At block 720, for each session record, grouping engine 435 maps flag values of the key events of the session record with a session signature stored in storage device 450 and obtains the inference data stored in association with the mapped session signature. At block 725, client instance 420 performs predetermined operations based on the obtained inference data for the plurality of session records. For example, client instance 420 presents report data on trends that indicate the value of content being presented to users of client instance 420. As another example, client instance 420 may assist the user of the session to solve the problem the user is having by presenting content based on the obtained inference data associated with the session signature and based on associated data logged by logging engine 430. FIG. 8 (explained in detailed below) illustrates an exemplary operation performed at block 725 in accordance with one embodiment in which the session signatures are used for determining value of content by measuring deflection and attributing deflection to particular pieces of content. At block 730, a value is attributed to content based on the inference data associated with the session record and the information of the content attribution value is stored in storage device 450.

FIG. 8 shows a screen shot of GUI 800 for rendering widgets on a deflection dashboard to visualize derived inference data associated with intent to create an incident and deflected incidents in accordance with one or more embodiments. GUI 800 may be displayed on a display of any of remote client devices 410A-N to visualize deflection measurement data associated with client instance 420. GUI 800 may include one or more user interactive screens that allow for a user to interact with a program of UI engine 440 performing one or more operations of client instance 420. The deflection dashboard of GUI 800 shows widgets for the most relevant indicators for client instance 420. Information can be presented using several visualizations, such as charts, scorecards, lists, or dials. The dashboard may be divided into tabs 805A-B to logically group widgets that belong together. A dashboard may have multiple rows with each row having a number of "placeholders" or columns, and each placeholder holding a widget and each widget containing information about one or more indicators and breakdowns. As shown in FIG. 8, deflection dashboard of GUI 800 has widgets 810, 820, and 830. Widget 810 visualizes monthly direct deflection data including data for deflection percentage, possibly deflected, explicitly deflected, and intent to create an incident. Thus, widget 810 shows the monthly data of a total number of sessions (session records) of client instance 420 in which a mapping of the flag values of the key events to session signatures indicated an intent to create an incident. Further, widget 810 shows a comparison between this total number of sessions with a number of sessions in which the session signature indicates that the creation of the incident was explicitly deflected or possibly deflected. Finally, widget 810 shows the percentage between the total number of sessions with intent to create an incident and the total number of deflections. Widget 820 shows similar data including monthly total number of deflections, and monthly total number of sessions in which an incident was created (Red Line Incidents—Other; and Red Line Incidents—Web Only). Widget 830 shows content attribution data corresponding to the monthly deflection data based on the type of content. That is, widget 830 shows for each month, the total number of deflections subdivided based on the type of content (i.e., Service Catalog; Other Deflected; or Knowledge Base article) to which the deflection is attributed by grouping engine 435. A widget on deflection dashboard of GUI 800 may also show a comparison between the total number of sessions with intent to create an incident and the total number of deflections on a per business-unit basis. With such a widget, the value of content creation for different business units of an enterprise associated with client instance 420 can be ascertained by comparing the percentage between the intent to create and deflection for each business unit. Further, as illustrated in FIG. 8, only those sessions in which there was derived an intent to create an incident are counted for comparison against the number of deflected incidents. Thus, accurate data on effectiveness and value of content is made available to stakeholders without relying on guesswork or simply on the total number of views attributed to a piece of content.

FIG. 9 illustrates a high-level block diagram 900 of a processing device (computing system) that may be used to implement one or more disclosed embodiments (e.g., cloud resources platform/network 210, client devices 204A-204E, remote client devices 410A-N, client instance 420, client instance 308, server instances 214, data centers 306A-306B, etc.). For example, computing device 900 illustrated in FIG. 9 could represent a client device or a physical server device and include either hardware or virtual processor(s) depending on the level of abstraction of the computing device. In some instances (without abstraction) computing device 900 and its elements as shown in FIG. 9 each relate to physical hardware and in some instances one, more, or all of the elements could be implemented using emulators or virtual machines as levels of abstraction. In any case, no matter how many levels of abstraction away from the physical hardware, computing device 900 at its lowest level may be implemented on physical hardware. As also shown in FIG. 9, computing device 900 may include one or more input devices 930, such as a keyboard, mouse, touchpad, or sensor readout (e.g., biometric scanner) and one or more output devices 915, such as displays, speakers for audio, or printers. Some devices may be configured as input/output devices also (e.g., a network interface or touchscreen display). Computing device 900 may also include communications interfaces 925, such as a network communication unit that could include a wired communication component and/or a wireless communications component, which may be communicatively coupled to processor 905. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 9, processing device 900 includes a processing element such as processor 905 that contains one or more hardware processors, where each hardware processor may have a single or multiple processor cores. In one embodiment, the processor 905 may include at least one shared cache that stores data (e.g., computing instructions) that are utilized by one or more other components of processor 905. For example, the shared cache may be a locally cached data stored in a memory for faster access by components of the processing elements that make up processor 905. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 9, the processing elements that make up processor 905 may also include one or more other types of hardware processing components, such as graphics processing units (GPUs), application specific integrated circuits (ASICs), field-programmable gate arrays (FPGAs), and/or digital signal processors (DSPs).

FIG. 9 illustrates that memory 910 may be operatively and communicatively coupled to processor 905. Memory 910 may be a non-transitory medium configured to store various types of data. For example, memory 910 may include one or more volatile devices such as random access memory (RAM). Non-volatile storage devices 920 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 920 may be used to store overflow data if allocated RAM is not large enough to hold all working data. The non-volatile storage devices 920 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 905. In one embodiment, the compiling process of the software program may transform program code written in a programming language to another computer language such that the processor 905 is able to execute the programming code. For example, the compiling process of the software program may generate an executable program that provides encoded instructions (e.g., machine code instructions) for processor 905 to accomplish specific, non-generic, particular computing functions.

After the compiling process, the encoded instructions may then be loaded as computer executable instructions or process steps to processor 905 from storage 920, from memory 910, and/or embedded within processor 905 (e.g., via a cache or on-board ROM). Processor 905 may be configured to execute the stored instructions or process steps in order to perform instructions or process steps to transform the computing device into a non-generic, particular, specially programmed machine or apparatus. Stored data, e.g., data stored by a storage device 920, may be accessed by processor 905 during the execution of computer executable instructions or process steps to instruct one or more components within the computing device 800.

A user interface (e.g., output devices 915 and input devices 930) can include a display, positional input device (such as a mouse, touchpad, touchscreen, or the like), keyboard, or other forms of user input and output devices. The user interface components may be communicatively coupled to processor 905. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 900 may comprise other components well known in the art, such as sensors, powers sources, and/or analog-to-digital converters, not explicitly shown in FIG. 9.

According to one example, a method includes storing a plurality of session signatures and inference data in association with the plurality of session signatures, wherein the plurality of session signatures represent different combinations of values of key events; tracking a plurality of session events; grouping the plurality of session events based on corresponding session IDs to create a plurality of session records, wherein each of the plurality of session records includes corresponding values of the key events; mapping each session record to a session signature from among the stored plurality of session signatures based on the corresponding values of the key events of the session record; obtaining inference data associated with the mapped session signature; and performing a predetermined operation based on the inference data.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A computer system, comprising:
    a storage device configured to store a plurality of session signatures and a plurality of inference flags associated with the plurality of session signatures, wherein each session signature represents a combination of flag values, each flag value signifying a key event;
    a network interface; and
    one or more processors communicatively coupled to the storage device and the network interface, the one or more processors executing computer instructions that cause the computer system to:
        provide a hosted client instance via the network interface to communicatively couple with a plurality of remote client devices;
        log a plurality of session events with the hosted client instance, each session event issuing from one of the plurality of remote client devices, and each session event having a corresponding session identifier (ID) and associated data;
        group the plurality of session events based on their corresponding session IDs;
        create, based on the grouped session events, a plurality of session records, wherein each session record includes flag values for a plurality of the key events;
        map, for each session record, key event flag values of the respective session record to the corresponding combination of flag values for a different session signature from among the stored plurality of session signatures;
        identify, for each session record and based on the map, the different session signature from among the stored plurality of session signatures;
        obtain, from the storage device, a value of at least one inference flag associated with the identified session signature; and
        perform a predetermined operation based on the obtained value of the at least one inference flag.

2. The computer system according to claim 1, wherein the plurality of session signatures include a plurality of deflection signatures, and the plurality of inference flags include a deflection flag and an intent flag and further comprising computer instructions to cause the computer system to:
    identify, for each session record, a deflection signature from among the stored deflection signatures based on the key event flag values of the session record;
    obtain, from the storage device, values of the deflection flag and the intent flag associated with the identified deflection signature; and
    cause deflection measurement data to be presented on one or more of the remote client devices by rendering one or more widgets indicating a comparison between the values of the intent flags and the deflection flags of the plurality of session records.

3. The computer system according to claim 2, wherein the intent flag represents whether or not the corresponding deflection signature indicates an intent to create an incident, and the deflection flag represents whether the corresponding deflection signature indicates that creation of the incident was deflected.

4. The computer system according to claim 2, further comprising computer instructions to cause the computer system to set values of the deflection and intent flags associated with each of the plurality of deflection signatures in accordance with a user operation.

5. The computer system according to claim 2, further comprising computer instructions to cause the computer system to:
    attribute a deflection credit to a content element responsive to a determination that an obtained deflection flag value of a given session record is set to true, wherein the content element includes one or more of a knowledge base article, a community forum post, a service catalog, a video, and a document; and
    store information regarding the content element in a deflection credit field of the given session record.

6. The computer system according to claim 1, wherein the plurality of key events include a "login event", a "search event", a "view content event", a "get help page event", and a "create incident event".

7. The computer system according to claim 1, wherein:
    the plurality of inference flags include a content presentment flag which is indicative of whether or not a corresponding session signature indicates that one or more pieces of content should be presented to a user of the corresponding session record; and
    further comprising computer instructions to cause the computer system to, responsive to a determination that an obtained value of the content presentment flag of a given session record is set to true, present one or more content elements to a user associated with the given session record based on data of a plurality of session events of the given session record.

8. The computer system according to claim 7, wherein presenting the one or more content elements includes presenting at least one of a chat bot virtual agent and a recommendation for presenting one or more of a knowledge base article, a community forum post, a service catalog, a video, and a document.

9. The computer system according to claim 1, further comprising computer instructions to cause the computer system to:

determine whether a plurality of session events corresponding to a given session ID occurred within a predetermined period of time; and group the plurality of session events corresponding to the given session ID by creating the session record responsive to a determination that the plurality of session events corresponding to the given session ID occurred within the predetermined period of time.

10. A method comprising:

storing a plurality of session signatures and a plurality of inference flags associated with the plurality of session signatures, wherein each session signature represents a combination of flag values, each flag value signifying a key event;

providing a hosted client instance via a network interface to communicatively couple with a plurality of remote client devices;

logging a plurality of session events with the hosted client instance, each session event issuing from one of the plurality of remote client devices, and each session event having a corresponding session identifier (ID) and associated data;

grouping the plurality of session events based on their corresponding session IDs;

creating, based on the grouped session events, a plurality of session records, wherein each session records includes flag values for a plurality of the key events;

mapping, for each session record, key event flag values of the respective session record to the corresponding combination of flag values for a different session signature from among the stored plurality of session signatures;

identifying, for each session record and based on the map, the different session signature from among the stored plurality of session signatures;

obtaining, from a storage device, a value of at least one inference flag associated with the identified session signature; and performing a predetermined operation based on the obtained value of the at least one inference flag.

11. The method according to claim 10, wherein the plurality of session signatures include a plurality of deflection signatures, and the plurality of inference flags include a deflection flag and an intent flag; and wherein the method further comprises:

identifying, for each session record, a deflection signature from among the stored deflection signatures based on the key event flag values of the session record;

obtaining, from the storage device, values of the deflection flag and the intent flag associated with the identified deflection signature; and causing deflection measurement data to be presented on one or more of the remote client devices by rendering one or more widgets indicating a comparison between the values of the intent flags and the deflection flags of the plurality of session records.

12. The method according to claim 11, wherein the intent flag represents whether or not the corresponding deflection signature indicates an intent to create an incident, and the deflection flag represents whether the corresponding deflection signature indicates that creation of the incident was deflected.

13. The method according to claim 11, further comprising setting values of the deflection and intent flags associated with each of the plurality of deflection signatures in accordance with a user operation.

14. The method according to claim 11, further comprising:

attributing a deflection credit to a content element responsive to a determination that an obtained deflection flag value of a given session record is set to true, wherein the content element includes one or more of a knowledge base article, a community forum post, a service catalog, a video, and a document; and storing information regarding the content element in a deflection credit field of the given session record.

15. The method according to claim 10, wherein the plurality of key events include a "login event", a "search event", a "view content event", a "get help page event", and a "create incident event".

16. The method according to claim 10, wherein the plurality of inference flags include a content presentment flag which is indicative of whether or not a corresponding session signature indicates that one or more pieces of content should be presented to a user of the corresponding session record; and wherein the method further comprises, responsive to a determination that an obtained value of the content presentment flag of a given session record is set to true, presenting one or more content elements to a user associated with the given session record based on data of a plurality of session events of the given session record.

17. The method according to claim 16, wherein presenting the one or more content elements includes presenting at least one of a chat bot virtual agent and a recommendation for presenting one or more of a knowledge base article, a community forum post, a service catalog, a video, and a document.

18. The method according to claim 10, further comprising:

determining whether a plurality of session events corresponding to a given session ID occurred within a predetermined period of time; and grouping the plurality of session events corresponding to the given session ID by creating the session record responsive to a determination that the plurality of session events corresponding to the given session ID occurred within the predetermined period of time.

19. A non-transitory computer readable recording medium having stored thereon a program that is executable by a computer of a cloud-based computer system, the program comprising instructions that when executed cause the computer to perform functions comprising:

storing a plurality of session signatures and a plurality of inference flags associated with the plurality of session signatures, wherein each session signature represents a combination of flag values, each flag value signifying a key event;

providing a hosted client instance via a network interface to communicatively couple with a plurality of remote client devices;

logging a plurality of session events with the hosted client instance, each session event issuing from one of the plurality of remote client devices, and each session event having a corresponding session identifier (ID) and associated data;

grouping the plurality of session events based on their corresponding session IDs;

creating, based on the grouped session events, a plurality of session records, wherein each session records includes flag values of a plurality of the key events;

mapping, for each session record, key event flag values of the respective session record to the corresponding combination of flag values for a different session signature from among the stored plurality of session signatures;

identifying, for each session record and based on the map, the different session signature from among the stored plurality of session signatures;

obtaining, from a storage device, a value of at least one inference flag associated with the identified session signature; and performing a predetermined operation based on the obtained value of the at least one inference flag.

20. The non-transitory computer readable recording medium according to claim 19, wherein the plurality of session signatures include a plurality of deflection signatures, and the plurality of inference flags include a deflection flag and an intent flag; and wherein the program further comprises instructions that when executed cause the computer to perform functions comprising:

identifying, for each session record, a deflection signature from among the stored deflection signatures based on the key event flag values of the session record;

obtaining, from the storage device, values of the deflection flag and the intent flag associated with the identified deflection signature; and causing deflection measurement data to be presented on one or more of the remote client devices by rendering one or more widgets indicating a comparison between the values of the intent flags and the deflection flags of the plurality of session records.

* * * * *